Patented Sept. 8, 1953

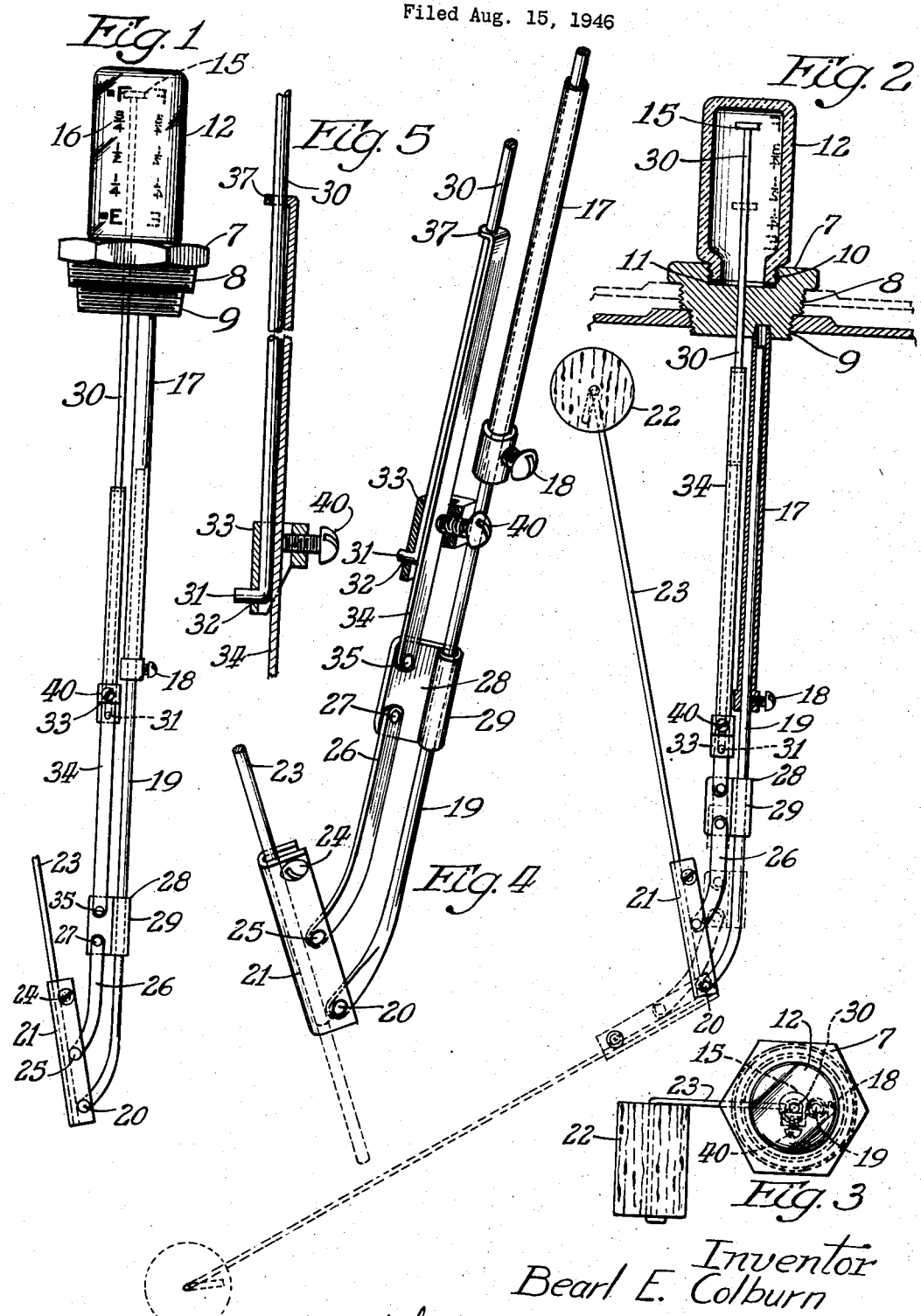

2,651,200

UNITED STATES PATENT OFFICE 2,651,200

TANK GAUGE

Bearl E. Colburn, Green Bay, Wis.

Application August 15, 1946, Serial No. 690,715

11 Claims. (Cl. 73—317)

1

This invention relates to improvements in tank gages.

It is a primary object of the invention to provide a gage of universal application within a wide range of tank sizes, with simple adjustments to accommodate the gage to the various sizes of tanks in which it is usable, and means for hermetically sealing the gage glass against escape of vapor.

Other objects will be apparent in more detail from the following disclosure of my invention:

In the drawings:

Fig. 1 is a fragmentary view in side elevation of the gage mechanism embodying my invention.

Fig. 2 is a view partially in side elevation and partially in axial section showing in full and dotted lines the gage mechanism illustrated in Fig. 1 in its two extreme adjustments.

Fig. 3 is a view in plan of the gage mechanism shown in Figs. 1 and 2.

Fig. 4 is an enlarged fragmentary detail view in perspective of the parts of the mechanism in which adjustments are effected.

Fig. 5 is a fragmentary detail view partially in side elevation and partially in section of relatively adjustable parts of the structure shown in Fig. 4.

My entire gage is assembled upon a plug mounting 7 which has tapered pipe threads 8 and 9 of two different diameters. By using a two inch tapered pipe thread at 8 and an inch and one-half tapered pipe thread at 9, I am able to apply this plug interchangeably to all standard oil tanks. The plug is socketed at 10 to receive the gasket 11. The socket has an internal thread suitable to receive the threaded neck of transparent jar 12. Within this jar operates the indicator 15 and the wall of the jar carries a suitable scale 16 with respect to which the indicator moves to show the position of the float to which the indicator is connected as hereinafter described.

Screwed into the bottom of plug 7 is a telescopically extensible bracket. This bracket comprises a bracket tube 17 provided at or near its lower end with a set screw 18. Telescoping within the tube 17 and held in adjusted position by the screw 18 is a bracket extension rod or portion 19 for the support of the float lever and the guidance of the indicator connections. At the lower offset end of rod 19 is a pintle 20 on which the channel-shaped lever 21 is pivotally movable. The float 22 is carried at the end of an arm 23 which may comprise a rod, and which extends through the channel 21 between the pintle 20 and the bottom of the channel. The end of the channel remote from pintle 20 carries a screw 24 by means of which the channel may be clamped onto float arm 23 in any desired adjusted position of such rod longitudinally of the channel.

Intermediate the ends of the channel there is

2 another pintle at 25 whereby link 26 is pivoted to the channel. At 27 the link 26 is pivoted to a slide 28 having a tubular eye 29 guided on rod 19. The indicator rod 30 upon which the indicator disk 15 is mounted is in substantial alignment with the offset end of bracket rod 19 and has its end 31 turned at right angles and extended through an opening 32 in a clip 33 which is slotted to receive the extension bar 34. This bar is pivoted at 35 to the slide 28 and has an offset end portion 37 apertured to slide upon the indicator rod 30 in the adjustment of the parts. The set screw 40 threaded into the clip 33 clamps the bar 34 and rod 30 together in selected adjustment. The direction of adjustment of the indicator actuating extension bar 34 and its connections aforesaid is parallel to the direction of adjustment of bracket extension 19.

To place the gage in operation, the screws 18 and 40 are loosened to permit the float lever channel 21 to be located at about the middle of the tank whose contents are to be measured. It will be noted that with both of the screws 18 and 40 loosened, the float lever channel may be moved to any desired position, the two relatively extensible parts of the apparatus finding their proper relative positions of adjustment accordingly. The bracket rod 19 will telescope in the bracket tube 17 while the flat bar 34 will correspondingly extend itself with respect to the indicator rod 30. The tank being assumed to be empty, the indicator disk 15 will be in its lowest position, where it will support rod 30 from plug 7 while the lower extensible parts of the indicator actuator and the bracket respectively slide upon the upper parts of the indicator actuator and the bracket. Fig. 2 shows the bracket and indicator connections collapsed to their minimum length while Fig. 1 shows the bracket and indicator connections expanded to operate in a tank of greater depth.

When the fulcrum 20 of the float lever channel is positioned midway between the top and the bottom of the tank, the screws 18 and 40 will be tightened. Screw 18 will fix the length of the bracket and screw 40 will fix the length of the indicator actuator connections. Screw 24 is now loosened if it is necessary that the float lever rod be slid longitudinally through channel 21. The length of this rod should be so determined that the float will reach substantially to its lowermost and uppermost positions in the tank. Any surplus rod projecting as shown in dotted lines in Fig. 4 may then be cut off.

As the float oscillates upon its fulcrum 20, its motion is communicated through the connecting link 26 to the slide 28 which assures the rectilinear movement of the expansible indicator connections so that the indicator 15 will move smoothly up and down within the gage glass or jar 12 to show accurately the relative volume of the contents of the tank.

In practice, all movable parts are preferably securely riveted after adjustment to the particular tank in which the device is to be used.

I claim:

1. In an indicator, the combination with a mounting, of an indicator rod, a rod extension slidably adjustable upon said rod, means for locking the rod and extension in selected adjustment, a bracket comprising a part connected with said mounting and another part slidably adjustable respecting the first-mentioned part, means for locking said slidable bracket part in selected adjustment, a float lever pivoted to the slidably adjustable bracket part, a slide reciprocable on a bracket part and to which said indicator rod extension is terminally fastened whereby to laterally brace said indicator rod extension at its fastened terminal, and a link pivoted to the slide and to the float lever for communicating movement of the float lever to the slide and the extension and the indicator rod, said slidable bracket part having a portion aligned with the indicator rod and to which the float lever is pivoted.

2. The combination set forth in claim 1 in which the float lever comprises a member having an arm extensively adjustable respecting said member, and a float carried by said arm.

3. A gage mechanism comprising an apertured plug, a bracket tube connected with the plug beside the aperture, a bracket rod telescopically adjustable in the tube, the tube having a set scew for positioning the bracket rod, said bracket rod having an offset end, a pintle carried by said end, a float lever pivoted on said pintle for pivotal movement respecting the offset end of the bracket rod, a slide reciprocable along the bracket rod, a link having pivotal connection with the slide and with the float lever, an indicator rod extending through the aperture of the plug in substantial alignment with the offset end of the bracket rod, an indicator actuating member connected with the slide and adjustable longitudinally of the indicator rod, and set screw means for locking the actuating member and indicator rod in selected adjustment, said rod being provided beyond said plug with a terminal indicator.

4. In a gage structure the sub-combination which comprises a telescopically extensible bracket, a correspondingly extensible indicator connection paralleling the bracket, said bracket having a portion offset into alignment with said indicator connection, a slide mounted on the bracket for reciprocation and to which said indicator connection is attached whereby to laterally brace said indicator connection to said bracket, and a float lever pivoted on the offset portion of the bracket and provided with a link pivotally connecting it with said slide to cause the indicator connection to reciprocate rectilinearly, said slidable bracket part having a portion aligned with the indicator rod and to which the float lever is pivoted.

5. The combination set forth in claim 4 in which said slide comprises a plate having an eye in which an extensible portion of said bracket has relative sliding movement.

6. The combination set forth in claim 4 in which said slide comprises a plate having an eye in which a portion of said bracket has relative sliding movement, said float lever comprising an upwardly open channel member into which the offset end portion of said bracket extends and into which an end portion of said link extends.

7. Connections for actuating a gage from a float comprising an indicator rod, an extension member provided with an offset end having an aperture through which the rod extends slidably, a clip having an opening through which both said rod and said member extend, and a set screw threaded to the clip and extending into the opening and clamping the rod and member against the clip, the clip and said rod having means in positive connection.

8. Connections for actuating a gage from a float and comprising a gage rod having a laterally projecting end, an extension for said rod comprising a bar having an offset end provided with an aperture through which said rod is slidably adjustable, said bar extending along said rod, a clip encircling the rod and bar and provided with a lateral aperture in which the laterally projecting end of the rod is engaged, whereby the clip is positively connected with the rod, and a set screw threaded through the clip and engaged with the bar for clamping it to said rod for maintaining the adjustment between the rod and bar.

9. Apparatus for the float actuation of a gage and comprising the combination with a bracket and a channel member having flange means pivoted to the bracket, a float lever adjustable longitudinally through the channel member, a gage actuating link pivoted to said flange means, and a clamp screw threaded to said flange means and adapted to clamp the float lever in a selected position of longitudinal adjustment respecting the channel member.

10. In a direct reading tank gage of the type comprising a plug, a calibrated transparent closure connected with the plug, and a gage rod movable through the plug and provided with indicator means movable respecting the calibrations of said closure, the combination of an extension telescopically adjustable respecting the rod, a bracket mounted on the plug beside the rod and extending in substantial parallelism therewith, a telescopically adjustable extension of said bracket, a slide reciprocable on the bracket extension and to which the rod extension is connected, the end of the bracket extension being offset laterally toward the projected axis of the rod and its extension, a float lever pivoted to the offset end of the bracket extension, and a link connected with the slide and having an offset end portion connected with said lever.

11. The device of claim 10 in which said lever comprises an upwardly open channel member having spaced flanges between which the offset ends of the link and the bracket extension are pivoted, and a float arm longitudinally adjustable between said channel member flanges.

BEARL E. COLBURN.

References Cited in the file of this patent

UNITED STATES PATENTS

| Number | Name | Date |
| --- | --- | --- |
| 1,072,122 | Johnson | Sept. 2, 1913 |
| 1,225,108 | Carton | May 8, 1917 |
| 1,634,165 | Williams | June 28, 1927 |
| 1,716,399 | Watters | June 11, 1929 |
| 1,920,971 | De Giers | Aug. 8, 1933 |
| 1,937,231 | Klein | Nov. 28, 1933 |
| 2,255,310 | D'Arcey | Sept. 9, 1941 |
| 2,309,497 | Caddell | Jan. 26, 1943 |
| 2,446,844 | Molaver | Aug. 10, 1948 |

FOREIGN PATENTS

| Number | Country | Date |
| --- | --- | --- |
| 298,149 | Great Britain | Nov. 1, 1928 |